United States Patent [19]

Oba et al.

[11] 4,219,587

[45] Aug. 26, 1980

[54] PROCESS FOR PRODUCING PIGMENT-COATED PHOSPHORS

[75] Inventors: Yoichi Oba, Hachioji; Tsuyoshi Kano, Higashiyamato; Masaaki Hayashi, Kamakura; Hiroshi Takada, Yokohama; Katuzo Kanda, Oisomachi; Shusaku Eguchi, Minami-ashigara, all of Japan

[73] Assignees: Hitachi, Ltd.; Kasei Optonix, Ltd., both of Japan

[21] Appl. No.: 862,156

[22] Filed: Dec. 19, 1977

[30] Foreign Application Priority Data

Dec. 20, 1976 [JP] Japan .................................. 51-151988

[51] Int. Cl.$^2$ ........................... B05D 5/06; B05D 5/12
[52] U.S. Cl. ..................................... 427/64; 428/407; 427/68; 427/218; 427/221
[58] Field of Search ................. 427/68, 218, 215, 214, 427/221, 64; 428/403, 407; 260/42.15

[56] References Cited

U.S. PATENT DOCUMENTS

| | | | |
|---|---|---|---|
| 3,544,354 | 12/1970 | Kachel | 313/474 |
| 4,049,845 | 9/1977 | Lozier et al. | 427/218 |

OTHER PUBLICATIONS

"High Polymer Latices", *Blackley*, p. 27.

*Primary Examiner*—Sam Silverberg
*Attorney, Agent, or Firm*—Craig & Antonelli

[57] ABSTRACT

Pigment-coated phosphors which may be used in the production of a cathode-ray tube of a high contrast for a color television receiver can be produced by adding a pigment and an anionic polymer emulsion to an aqueous suspension of a phosphor and then making the system neutral or weakly acidic or adding a cationic polymer emulsion or carrying out both of these steps so that the phosphor and the pigment may be coated with the polymer.

13 Claims, No Drawings

PROCESS FOR PRODUCING PIGMENT-COATED PHOSPHORS

LIST OF PRIOR ART (37 CFR 1.56 (a))

The following reference is cited to show the state of the art:
U.S. Pat. No. 3,886,394

BACKGROUND OF THE INVENTION

The present invention relates to a process for producing pigment-coated phosphors which may be used in the production of a cathode-ray tube of a high contrast for a color television receiver and in which color filter particles (hereinafter referred to simply as "pigment") have been adhered onto the surface of phosphor particles.

More particularly, the invention pertains to a process for producing pigment-coated phosphors wherein onto the surface of a phosphor that radiates wavelengths of light corresponding to a specific portion of visible spectrum by electron-ray stimulation have been adhered pigment particles which function as a color filter that transmits wavelengths of light corresponding to the emission spectrum of the phosphor while absorbing wavelengths of light corresponding to the other portion of visible spectrum.

As a process for producing a pigment-coated phosphor, Mr. S. A. Lipp's process (U.S. Pat. No. 3,886,394) is known. According to the process, pigment-coated phosphors can be produced according to the following procedures:

(1) A pigment is milled in an aqueous solution of polyvinylpyrrolidone (hereinafter referred to simply as "PVP") for several days to 10 days and then diluted with distilled water.

(2) On the one hand, a phosphor is contacted with an aqueous gelatin solution and then washed with water.

(3) To the phosphor coated with gelatin in (2) is added the pigment coated with PVP in (1) so that the pigment may be adhered onto the surface of the phosphor.

The thus produced pigment-coated phosphor has been insufficient in adhesiveness between the pigment and the phosphor, and has a defect in that the pigment and the phosphor are separated from each other when a slurry of the phosphor is prepared, aged and then coated according to a usual method.

SUMMARY OF THE INVENTION

An object of the present invention is to provide an improved process for producing a pigment-coated phosphor.

Another object of the invention is to provide a process for producing a pigment-coated phosphor having high adhesiveness between the pigment and the phosphor.

The other objects and advantages of the present invention will be apparent from the following description.

These objects can be accomplished by a process for producing a pigment-coated phosphor which comprises the first step of adding a pigment and an anionic polymer emulsion to an aqueous suspension of a phosphor and the second step of carrying out at least one step selected from the group consisting of the step of making the mixture formed in the first step neutral or weakly acidic and the step of adding a cationic polymer emulsion to the said mixture.

DETAILED DESCRIPTION OF PREFERRED EMBODIMENTS

Each step of the process of the present invention will be explained below in the order of step.

First of all, a pigment is mixed with pure water and, for example, the mixture is kneaded by a ball mill, etc. for several days.

On the other hand, a phosphor is suspended in water. An anionic polymer emulsion is added to the resulting suspension and the mixture is well mixed.

An appointed amount of the above-mentioned dispersed pigment is added to this system. The mixture is well stirred. The pigment and the phosphor are bonded to each other by one of the following methods:

(1) A method for bonding the pigment and the phosphor with each other by making the system neutral (pH=7) or weakly acidic (pH=about 3 to 7, and preferably 4 to 6) with hydrochloric acid, acetic acid, etc.

(2) A method for bonding the pigment and the phosphor with each other by adding a cationic polymer emulsion to the system.

(3) A method which comprises carrying out both the methods (1) and (2).

In the method (2), it is preferable that the reaction system is almost neutral before the cationic polymer emulsion is added.

Here, as an anionic polymer emulsion, an emulsion of a copolymer of at least one nonionic monomer such as methyl acrylate, ethyl acrylate, butyl acrylate, hydroxypropyl acrylate, methyl methacrylate, ethyl methacrylate, butyl methacrylate, hydroxypropyl methacrylate or styrene, etc. and one anionic monomer such as acrylic acid, methacrylic acid or itaconic acid, etc. may be used. A copolymer of ethyl acrylate and acrylic acid and a copolymer of ethyl acrylate, methyl methacrylate and acrylic acid are preferable copolymers. In the latter copolymer, the content of methyl methacrylate is preferably less than 50% by weight based on the total weight of monomer units of the copolymer. The anionic polymer emulsion is used in an amount of 0.1 to 2 parts by weight, and preferably 0.2 to 1.0 part by weight, as a solid content per 100 parts by weight of a phosphor. If the amount is less than 0.1 part by weight, the adhesiveness between a pigment and a phosphor is insufficient. If the amount is more than 2 parts by weight, cohesion between phosphors is easy to occur.

Also, as a cationic polymer emulsion, an emulsion of a copolymer of at least one of the above-mentioned nonionic monomers and one cationic monomers such as dimethylaminoethyl acrylate, diethylaminoethyl acrylate, dimethylaminopropyl acrylate, dimethylaminoethyl methacrylate, diethylaminoethyl methacrylate or dimethylaminopropyl methacrylate, etc. may be used. The cationic polymer emulsion is used in an amount of 0.05 to 2.0 parts by weight, and preferably 0.1 to 1.0 part by weight, as a solid content per 100 parts by weight of a phosphor.

The process of the present invention is mainly applied to phosphors for color television. However, it goes without saying that the application of the process of the present invention is not necessarily restricted to phosphors for color television but the process is generally applicable to all the phosphors commonly used.

As for the phosphor used in the process of the present invention, for example, manganese-activated zinc orthophosphate phosphor [$Zn_3(PO_4)_2$: Mn], manganese-activated magnesium silicate phosphor [$MgSiO_3$: Mn], silver-activated zinc cadmium sulfide phosphor [(Zn, Cd) S: Ag], europium-activated yttrium oxysulfide phosphor [$Y_2O_2S$: Eu] europium-activated yttrium oxide phosphor [$Y_2O_3$: Eu], etc. are used as a red luminescent phosphor. Manganese-activated zinc magnesium fluoride phosphor [($ZnF_2.MgF_2$): Mn], manganese-activated potassium magnesium fluoride phosphor [($KF.MgF_2$): Mn], manganese-activated magnesium fluoride phosphor [$MgF_2$: Mn], silver-activated zinc cadmium sulfide phosphor [(Zn, Cd) S: Ag], copper-activated zinc cadmium sulfide phosphor [(Zn, Cd)S: Cu], lead and manganese-activated calcium silicate phosphor [$CaSiO_3$: Pb, Mn], etc. are used as an orange or yellow luminescent phosphor. Manganese-activated zinc silicate phosphor [$Zn_2SiO_4$: Mn], copper-activated zinc sulfide phosphor [ZnS: Cu], copper and aluminum-activated zinc sulfide phosphor [ZnS: Cu, Al], copper-activated zinc cadmium sulfide phosphor [(Zn, Cd)S: Cu], zinc-activated zinc oxide phosphor [ZnO: Zn], silver-activated zinc cadmium sulfide phosphor [(Zn, Cd)S: Ag], silver-activated zinc sulfoselenide phosphor [Zn (S, Se): Ag], etc. are used as a green luminescent phosphor. Also, calcium tungstate phosphor ($CaWO_4$), silver-activated zinc sulfide phosphor (ZnS: Ag), silver and aluminum-activated zinc sulfide phosphor (ZnS: Ag, Al), silver and chlorine-activated zinc sulfide phosphor (ZnS: Ag, Cl), cerium-activated calcium magnesium silicate phosphor ($2CaO.MgO.2SiO_2$: Ce), terbium-activated yttrium oxysulfide phosphor ($Y_2O_2S$: Tb), titanium-activated calcium magnesium silicate phosphor [(Ca, Mg) $SiO_2$: Ti], etc. are used as a blue or violet luminescent phosphor. It is preferable for the phosphors used in the process of the present invention to have an average particle size of 3 to 12$\mu$.

As for the pigments used in the process of the present invention, for example, cadmium sulfoselenide [$Cd(S_{1-x}Se_x)$, $0<x<1$], iron oxide ($Fe_2O_3$), copper suboxide ($Cu_2O$), cadmium mercury red (CdS+HgS), chrome vermilion ($PbCrO_4.PbSO_4$), silver vermilion (HgS), antimony red ($Sb_2S_3$), copper ferrocyanide [$Cu_2Fe(CN)_6$], iodine red [$HgI_2$], zinc iron red [Zn-Fe], the other red ceramic pigments, etc. are used as a red pigment. Basic lead chromate [$(PbCrO_4)_m.(PbO)_n$], chrome yellow ($PbCrO_4$), ochre ($Fe_2O_3.SiO_2.Al_2O_3$), cadmium yellow (CdS), titanium yellow ($TiO_2$—NiO—$Sb_2O_3$), litharge (PbO), minium ($Pb_3O_4$), zinc iron yellow (Zn-Fe), the other orange or yellow ceramic pigments, etc. are used as an orange or yellow pigment. Chrome green {$PbCrO_4+Fe_4[Fe(CN)_6]_3.nH_2O$}, cobalt green (CoO.nZnO), chromium oxide ($Cr_2O_3$) and the other green ceramic pigments, etc. are used as a green pigment. Also, ultramarine blue ($3NaAl.SiO_2.Na_2S$), Berlin blue {$Fe_4[Fe(CN)_6]_3.nH_2O$}, cobalt aluminate ($CoO.nAl_2O_3$), Cerulean blue ($CoO.nSnO_2$), copper sulfide (CuS) and the other blue ceramic pigments are used as a blue pigment. It is preferable for the pigments used in the process of the present invention to have an average particle size of 0.5$\mu$ or less.

A ratio of the amount of a pigment to the amount of the phosphor depends upon the kind of the phosphor, the kind of the pigment, the desired amount of the pigment adhered, etc., but the amount of the pigment used is an amount effective to fulfil a function as a color filter and is usually not more than 15 parts by weight, and is preferably 0.1 to 10 parts by weight, per 100 parts by weight of the phosphor. If the amount of the pigment used is more than 15 parts by weight per 100 parts by weight of the phosphor, the luminous brightness of the resulting pigment-coated phosphor is remarkably reduced.

Examples of a combination of a phosphor and a pigment used in the present invention are shown below.

Red luminescent phosphor:
{ Europium-activated yttrium oxysulfide
  ($Y_2O_2S$: Eu0)
  Red pigment:
  $\alpha$-Iron oxide
Blue luminescent phosphor:
{ Silver-activated zinc sulfide (ZnS: Ag)
  Blue pigment:
  Cobalt aluminate
Green luminescent phosphor:
{ Copper and aluminum-activated zinc sulfide
  (ZnS: Cu, Al)
  Green pigment:
  Chromium oxide It goes without saying that combinations of a phosphor and a pigment other than the above-mentioned ones can be used in the present invention.

The following examples illustrate the present invention in more detail.

EXAMPLE 1

A mixture of 10 g of cobalt aluminate of an average particle size of 0.3$\mu$ as a blue pigment and 90 g of water is milled by a ball mill for 2 days and is then added with 200 g of water to dilute the mixture.

On the other hand, 500 g of a blue luminescent phosphor (ZnS: Ag, Cl) of an average particle size of 10.5$\mu$ is dispersed in 500 g of water and is then added with 2.7 g as a solid content of an anionic polymer emulsion comprising a copolymer of ethyl acrylate, methyl methacrylate and acrylic acid. Thereto is added the above-mentioned diluted pigment slurry. The pigment and the phosphor are adhered with each other according to one of the following seven procedures:

(1) The pH of the system is adjusted to 5.9 with dilute hydrochloric acid.

(2) To the system is added 0.25 g as a solid content of a cationic polymer emulsion comprising a copolymer of ethyl acrylate and dimethylaminoethyl methacrylate and the pH of the mixture is then adjusted to 6.8 with dilute hydrochloric acid.

(3) To the system is added 0.5 g as a solid content of the above-mentioned cationic polymer emulsion and the pH of the mixture is then adjusted to 6.3 with dilute hydrochloric acid.

(4) To the system is added 1.0 g as a solid content of the above-mentioned cationic polymer emulsion and the pH of the mixture is then adjusted to 6.4 with dilute hydrochloric acid.

(5) To the system is added 2.5 g as a solid content of the above-mentioned cationic polymer emulsion and the pH of the mixture is then adjusted to 6.5 with dilute hydrochloric acid.

(6) To the system is added 5.0 g as a solid content of the above-mentioned cationic polymer emulsion and the pH of the mixture is then adjusted to 6.7 with dilute hydrochloric acid.

(7) To the system is added 2.5 g as a solid content of the above-mentioned cationic polymer emulsion. The pH of the mixture is 8.3.

Pigment-coated phosphors are obtained through subsequent steps of washing with deionized water, drying and sieving.

The adhesiveness between the pigment and the phosphor is evaluated according to the following method:

10 Grams of a pigment-coated phosphor is entered into 30 ml of an aqueous solution having the following composition:

| | |
|---|---|
| 10% Aqueous polyvinyl alcohol solution | 100 g |
| 5% Neutral aqueous solution of ammonium dichlomate | 18 ml |
| 10% Aqueous solution of "Tween20"* | 1 ml |
| 5% Aqueous solution of "Pluronic L-92"** | 1 ml |
| Water | 180 ml |

*"Tween 20" is a trademark for a polyoxyethylene sorbitan monolaurate manufactured by Atlas Chemical Industries, Inc.
**"Pluronic L-92" is a trademark for a poly-oxyethylene-polyoxypropylene block copolymer manufactured by Asahi Denka Kogyo K.K.

After stirring for 30 minutes, the resulting slurry is allowed to stand for 60 minutes. Thereafter, 5 ml of the supernatant liquid is separated and diluted ten times. The transmission percentage of the diluted solution at 600 nm is measured. The adhesiveness can be evaluated by the transmission percentage value measured. The higher transmission percentage value shows that the adhesiveness between the pigment and the phosphor is larger.

The results obtained are as follows:

| Procedure | Transmission % |
|---|---|
| (1) | 86.2 |
| (2) | 87.5 |
| (3) | 90.5 |
| (5) | 86.1 |
| (5) | 90.4 |
| (6) | 87.0 |
| (7) | 85.0 |
| Known process (U.S. Patent 3,886,394) | 41.0 |
| Blank (contaning no pigment-coated phosphor) | 92.0 |

Thus, it is found that the adhesiveness between the pigment and the phosphor in the pigment-coated phosphors according to the process of the present invention is very large.

EXAMPLE 2

Five pigment-coated phosphors are produced in the same manner as in Example 1 except that the amount of the anionic polymer emulsion added is 0.5 g, 1.0 g, 2 g, 5 g and 10 g, and the amount of the cationic polymer emulsion added is 1 g. The adhesiveness is evaluated for the resulting five pigment-coated phosphors in the same manner as in Example 1. The results obtained are as follows:

| Amount of anionic emulsion added (g) | Transmission % |
|---|---|
| 0.5 | 47.5 |
| 1 | 77.9 |
| 2 | 86.6 |
| 5 | 89.7 |
| 10 | 88.2 |

EXAMPLE 3

Pigment-coated phosphors are produced in the same manner as in Example 1 except that said emulsion of a copolymer of ethyl acrylate, methyl methacrylate and acrylic acid as an anionic polymer emulsion is replaced by an emulsion of a copolymer of ethyl acrylate and acrylic acid (I) or an emulsion of a copolymer of n-butyl methacrylate, isobutyl methacrylate and methacrylic acid (II), said emulsion of a copolymer of ethyl acrylate and dimethylaminoethyl methacrylate copolymer as a cationic polymer emulsion is replaced by an emulsion of a copolymer of ethyl acrylate, methyl methacrylate and diethylaminoethyl methacrylate (III) or an emulsion of a copolymer of n-butyl methacrylate, methyl methacrylate and dimethylaminoethyl methacrylate (IV), the pH of the mixture after addition of the cationic polymer emulsion is adjusted to 6.0 with dilute hydrochloric acid, and the amounts of the anionic polymer emulsion and the cationic polymer emulsion added are 0.5% and 0.2% by weight as a solid content, respectively, based on the weight of the phosphor. The results obtained are as shown in the following table:

Table

| Anionic polymer emulsion | Cationic polymer emulsion | Transmisson % |
|---|---|---|
| I | III | 87.5 |
| I | IV | 90.2 |
| II | III | 88.4 |
| II | IV | 89.1 |

EXAMPLE 4

A mixture of 10 g of cobalt aluminate ($CoO.nAl_2O_3$) of an average particle size of $0.3\mu$ as a blue pigment and 90 g of water is kneaded by a ball mill for 2 days, and 100 g of water is added to dilute the mixture.

On the one hand, 500 g of silver and chlorine-activated zinc sulfide blue luminescent phosphor (ZnS: Ag, Cl) of an average particle size of $10.1\mu$ is dispersed in 500 g of water. To the dispersion is added 0.65, 0.85 and 1.04% by weight of an emulsion of a copolymer of ethyl acrylate, methyl methacrylate and methacrylic acid as an anionic polymer emulsion based on the weight of the phosphor. The above-mentioned diluted pigment slurry is added to the mixture. Thereafter, 0.15 and 0.20% by weight of the same cationic polymer emulsion as that used in Example 1 based on the weight of the phosphor is added. The pH of the system is adjusted to 4.0 to 6.0 with dilute hydrochloric acid to adhere the pigment and the phosphor with each other.

Through subsequent steps of washing with water, dehydration, drying and sieving according to a usual method, pigment-coated phosphors are obtained. When the adhesiveness of the resulting pigment-coated phosphors is evaluated in the same manner as in Example 1, it is found that the transmission percentage values are $85.0\pm5\%$.

EXAMPLE 5

A mixture of 3 g of α-iron oxide (α-Fe$_2$O$_3$) of an average particle size of 0.2μ as a red pigment and 50 g of water is kneaded by a ball mill for 2 days, and 100 g of water is then added to dilute the mixture.

On the one hand, 1000 g of europium-activated yttrium oxysulfide phosphor (Y$_2$O$_2$S: Eu) of an average particle size of 9.5μ as a red luminescent phosphor is dispersed in 1000 g of water. The above-mentioned diluted pigment slurry is added to the dispersion. Thereto is added 3.4 g as a solid content of the same anionic polymer emulsion as that used in Example 1. The pH of the system is adjusted to 6.0. The adhesiveness of the thus obtained pigment-coated phosphor is evaluated in the same manner as in Example 1 except that transmission percentage is measured at a wavelength of 500 nm. As a result, it is found that the transmission percentage value for the product of this example is 81.8% while that for a pigment-coated phosphor obtained according to a prior art process is 48.0%.

What is claimed is:

1. A process for producing a pigment-coated phosphor which comprises the first step of adding a pigment and an anionic polymer emulsion to an aqueous suspension of a phosphor to form a mixture and the second step of carrying out the step of adding a cationic polymer emulsion to the said mixture and making the resulting mixture weakly acidic by adjusting the pH to a value ranging from 6 to 4.

2. A process according to claim 1, wherein said pigment is added as an aqueous suspension thereof.

3. A process according to claim 1, wherein the amount of said pigment added is an amount effective to fulfil a function as a color filter and is not more than 15 parts by weight per 100 parts by weight of said phosphor.

4. A process according to claim 3, wherein the amount of said pigment added is 0.1 to 10 parts by weight per 100 parts by weight of said phosphor.

5. A process according to claim 1, wherein the amount of said anionic polymer emulsion added is 0.1 to 2 parts by weight as a solid content per 100 parts by weight of said phosphor.

6. A process according to claim 5, wherein the amount of said anionic polymer emulsion added is 0.2 to 1.0 part by weight as a solid content per 100 parts by weight of said phosphor.

7. A process according to claim 5, wherein the amount of said cationic polymer emulsion added is 0.05 to 2.0 parts by weight as a solid content per 100 parts by weight of said phosphor.

8. A process according to claim 7, wherein the amount of said cationic polymer emulsion added is 0.1 to 2.0 parts by weight as a solid content per 100 parts by weight of said phosphor.

9. A process according to claim 1, wherein said phosphor has an average particle size of 3 to 12μ.

10. A process according to claim 1, wherein said pigment has an average particle size of 0.5μ or less.

11. A process according to claim 1, wherein the anionic polymer emulsion is a copolymer emulsion of at least one non-ionic monomer selected from the group consisting of methyl acrylate, ethyl acrylate, butyl acrylate, hydroxypropyl acrylate, methyl methacrylate, ethyl methacrylate, butyl methacrylate and hydroxypropyl methacrylate with an anionic monomer selected from the group consisting of acrylic acid, methacrylic acid and itaconic acid.

12. A process according to claim 1, wherein the pH is adjusted by adding an acid selected from the group consisting of hydrochloric acid and acetic acid to the mixture.

13. In a process for producing a pigment-coated phosphor which comprises the step of adding a pigment and an anionic polymer emulsion to an aqueous suspension of a phosphor to form a mixture, the step of adding a cationic polymer emulsion to the mixture and the step of adjusting the pH of the resulting mixture to a value ranging from 6 to 4.

* * * * *